United States Patent
Miller et al.

(10) Patent No.: US 9,965,326 B1
(45) Date of Patent: May 8, 2018

(54) PREDICTION AND MANAGEMENT OF MULTI-CORE COMPUTATION DERATION

(71) Applicant: Rockwell Collins, Inc., Cedar Rapids, IA (US)

(72) Inventors: David A. Miller, Swisher, IA (US); Carl J. Henning, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 135 days.

(21) Appl. No.: 15/194,246

(22) Filed: Jun. 27, 2016

(51) Int. Cl.
*G06F 9/50* (2006.01)
(52) U.S. Cl.
CPC .................... *G06F 9/5027* (2013.01)
(58) Field of Classification Search
CPC ...................................................... G06F 9/5027
See application file for complete search history.

(56) References Cited

U.S. PATENT DOCUMENTS 5,541,863 A * 7/1996 Magor .................. G05B 17/02
701/14
6,226,757 B1 * 5/2001 Ware ................... G06F 13/4226
713/401
6,321,310 B1 * 11/2001 McCarthy ............... G06F 13/28
710/20

OTHER PUBLICATIONS

Pellizzon et al, Worst Case Delay Analysis for Memory Interference in Multicore Systems, 2010, EDAA.*

* cited by examiner

*Primary Examiner* — Charlie Sun
(74) *Attorney, Agent, or Firm* — Angel N. Gerdzhikov; Donna P. Suchy; Daniel M. Barbieri

(57) ABSTRACT

Systems and methods for predicting and managing computation derations that may occur in multi-core processors are disclosed. The method may include: determining effects of multi-core contentions on a particular core of a multi-core processor; determining effects of single-core contentions on a particular hosted function hosted on the multi-core processor; determining an adjustment time to a baseline activation time for the particular hosted function, wherein the adjustment time plus the baseline activation time overcome the effects of multi-core contentions and single-core contentions at a predetermined probability goal; and adjusting a computation time requirement of the particular hosted function to include the adjustment time and the baseline activation time.

14 Claims, 4 Drawing Sheets

PREDICTION AND MANAGEMENT OF MULTI-CORE COMPUTATION DERATION

BACKGROUND

A multi-core processor is a processor with two or more processing units (may be referred to as "cores") that can read and execute program instructions. A multi-core processor may be able to run multiple instructions at the same time, providing parallel computing that may be appreciated in various operating environments.

It is noted, however, that a multi-core processor may introduce certain types of interferences not typically encountered in a single-core processor. For example, a set of program instructions (may be referred to as a "hosted function") running on a multi-core processor may interfere with operations of one or more other hosted functions running on the same and/or different cores of the multi-core processor. It is noted that interferences as such may derate the computation capacity of the multi-core processor.

SUMMARY

In one aspect, embodiments of the inventive concepts disclosed herein are directed to a method. The method may include: determining effects of multi-core contentions on a particular core of a multi-core processor; determining effects of single-core contentions on a particular hosted function hosted on the multi-core processor; determining an adjustment time to a baseline activation time for the particular hosted function, wherein the adjustment time plus the baseline activation time overcome the effects of multi-core contentions and single-core contentions at a predetermined probability goal; and adjusting a computation time requirement of the particular hosted function to include the adjustment time and the baseline activation time.

In a further aspect, embodiments of the inventive concepts disclosed herein are directed to a method. The method may include: determining effects of multi-core contentions on a particular core of a multi-core processor; determining effects of single-core contentions on a particular hosted function hosted on the multi-core processor; determining an adjustment time to a baseline activation time for the particular hosted function, wherein the adjustment time plus the baseline activation time overcome the effects of multi-core contentions and single-core contentions at a predetermined probability goal; and allocating computation time of the multi-core processor to the particular hosted function based on the adjustment time and the baseline activation time determined for the particular hosted function.

In another aspect, embodiments of the inventive concepts disclosed herein are directed to a system. The system may include a data storage device and a multi-core processor in communication with the data storage device. The multi-core processor may be configured to: facilitate determination of data access performance effects of multi-core contentions on a particular core of the multi-core processor; facilitate determination of data access performance effects of single-core contentions on a particular hosted function hosted on the multi-core processor; facilitate determination of an adjustment time to a baseline activation time for the particular hosted function, wherein the adjustment time plus the baseline activation time overcome the data access performance effects of multi-core contentions and single-core contentions at a predetermined probability goal; and allocate computation time of the multi-core processor to the particular hosted function based on the adjustment time and the baseline activation time determined for the particular hosted function.

It is to be understood that both the foregoing general description and the following detailed description are exemplary and explanatory only and are not restrictive of the inventive concepts disclosed and claimed herein. The accompanying drawings, which are incorporated in and constitute a part of the specification, illustrate embodiments of the inventive concepts and together with the general description, serve to explain the principles and features of the inventive concepts disclosed herein.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
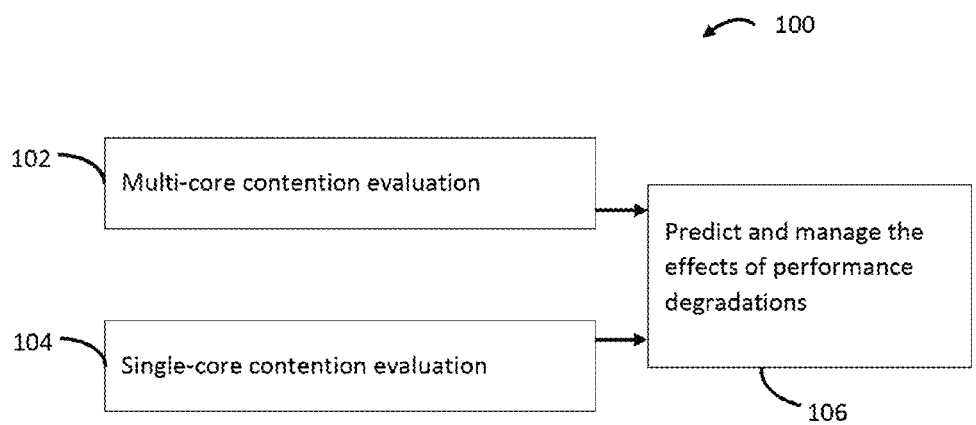
FIG. 1 is a flow diagram depicting an exemplary method for predicting and managing computation derations in a multi-core processor according to an exemplary embodiment of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Reference will now be made in detail to exemplary embodiments of the inventive concepts disclosed herein, examples of which are illustrated in the accompanying drawings.

Embodiments of the inventive concepts disclosed herein are directed to systems and methods configured for predicting and managing computation derations that may occur in multi-core processors. It is noted that providing the abilities to predict computation derations that may occur in a multi-core processors may help determine the arrangement or composition of functions that can be hosted on such a multi-core processor. It is contemplated that by taking computation derations into consideration, the effects of computation derations on the hosted functions may be effectively managed, which may in turn help improve the overall efficiency and reliability of the hosted functions.

Referring generally to FIG. 1, a flow diagram depicting an exemplary method 100 configured for predicting and managing computation derations in accordance with an embodiment of the inventive concepts disclosed herein is shown. The method 100 may include a multi-core contention determination/evaluation step 102 and a single-core contention determination/evaluation step 104. The multi-core contention evaluation step 102 may be utilized to study the multi-core processor hardware and characterize data access (e.g., access to a data storage device such as a memory) performance degradations that may occur due to interferences/contentions that may happen among the multiple cores of the multi-core processor. The single-core contention evaluation step 104, on the other hand, may be utilized to study behaviors of a particular hosted function running on a particular core and characterize memory/cache access performance degradations that may be experienced by that particular hosted function due to interferences/contentions with other functions running on the same core. The method 100 may then utilize the information obtained from the multi-core contention evaluation step 102 and the single-core contention evaluation step 104 to predict and manage the effects of performance degradations that may occur in a step 106.

Figure 2:
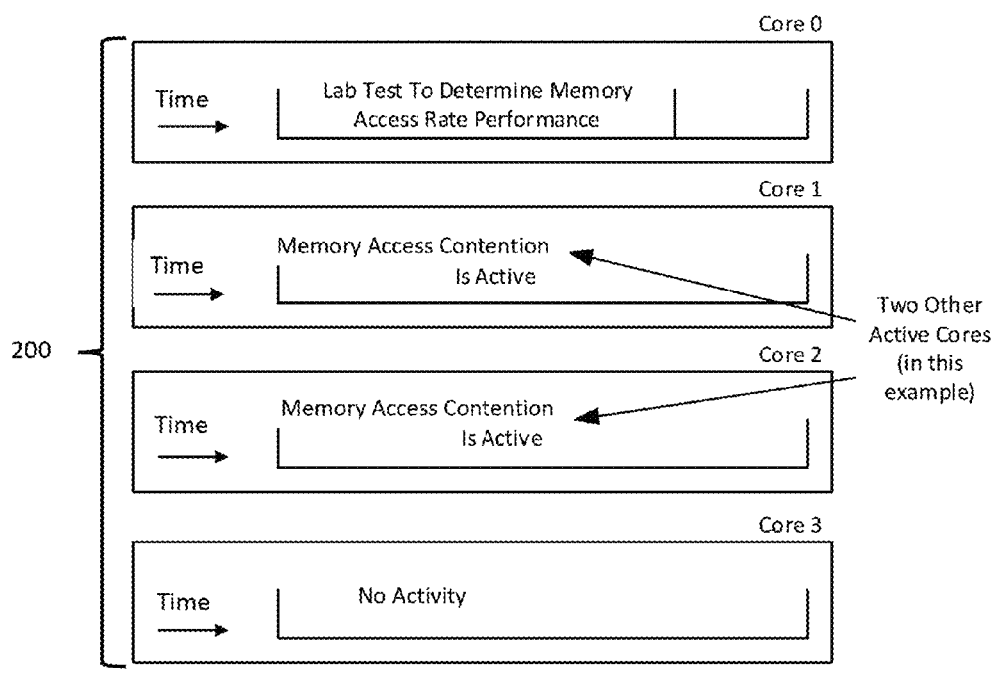
FIG. 2 is an illustration depicting an exemplary implementation of a multi-core contention evaluation step according to an exemplary embodiment of the inventive concepts disclosed herein.

Referring now to FIG. 2, an illustration depicting an exemplary implementation of the multi-core contention evaluation step 102 is shown. The multi-core contention evaluation step 102 depicted herein may be utilized to evaluate data access performance degradations that may occur on a core under test (e.g., Core 0) of a multi-core processor 200. The core under test may be loaded with instructions designed to test the data access performance of the core under test. For example, the instructions loaded on the core under test may carry out a representative sample of burst and strides to help establish a baseline data access performance of the core under test when all other cores of the multi-core processor 200 are set to idle. It is noted that performance metrics such as cache inspection times and memory access rates may be established for different access types, including instructions, data reads, and data writes.

The instructions loaded on the core under test may also help characterize changes in the baseline data access performance of the core under test when one or more additional cores (e.g., Core 1 and Core 2 shown in FIG. 2) become active to purposely introduce multi-core contentions. In some embodiments, changes in terms of cache inspection times and memory access rates may be characterized for the different access types, including instructions, data reads, and data writes.

It is contemplated that various techniques may be utilized to introduce multi-core contentions. For example, Core 1 and Core 2 shown in FIG. 2 may be loaded with memory interfering functions that are designed to make use of hardware data paths and to contend with the core under test (Core 0) in terms of memory access. The memory interfering functions may include, for example, large amounts of data access instructions as well as other types of memory interfering functions without departing from the broad scope of the inventive concepts disclosed herein.

It is also contemplated that activating Core 1 and Core 2 with memory interfering functions (as shown in FIG. 2) is merely shown for illustrative purposes and is not meant to be limiting. It is contemplated that other cores (and other combinations thereof) may be activated to help characterize changes in the baseline data access performance of the core under test without departing from the broad scope of the inventive concepts disclosed herein. It is also to be understood that while the illustration depicted in FIG. 2 shows characterization of data access performance of Core 0 (the core under test), such a depiction is merely illustrative and is not meant to be limiting. It is contemplated that the multi-core contention evaluation step 102 may be carried out a number of times to help characterize data access performances for a number of cores without departing from the broad scope of the inventive concepts disclosed herein.

It is note that the results obtained by the multi-core contention evaluation step 102 (which characterizes data access performance degradations that may occur due to multi-core contentions) may be reused as long as the hardware and the configurations of the multi-core processor 200 remain substantially unchanged. It is contemplated that if changes occur (e.g., if the system on a chip configuration has been modified in such a way that it affects the memory access times), the multi-core contention evaluation step 102 may be re-executed and the data access performances may be re-evaluated as needed.

Figure 3:
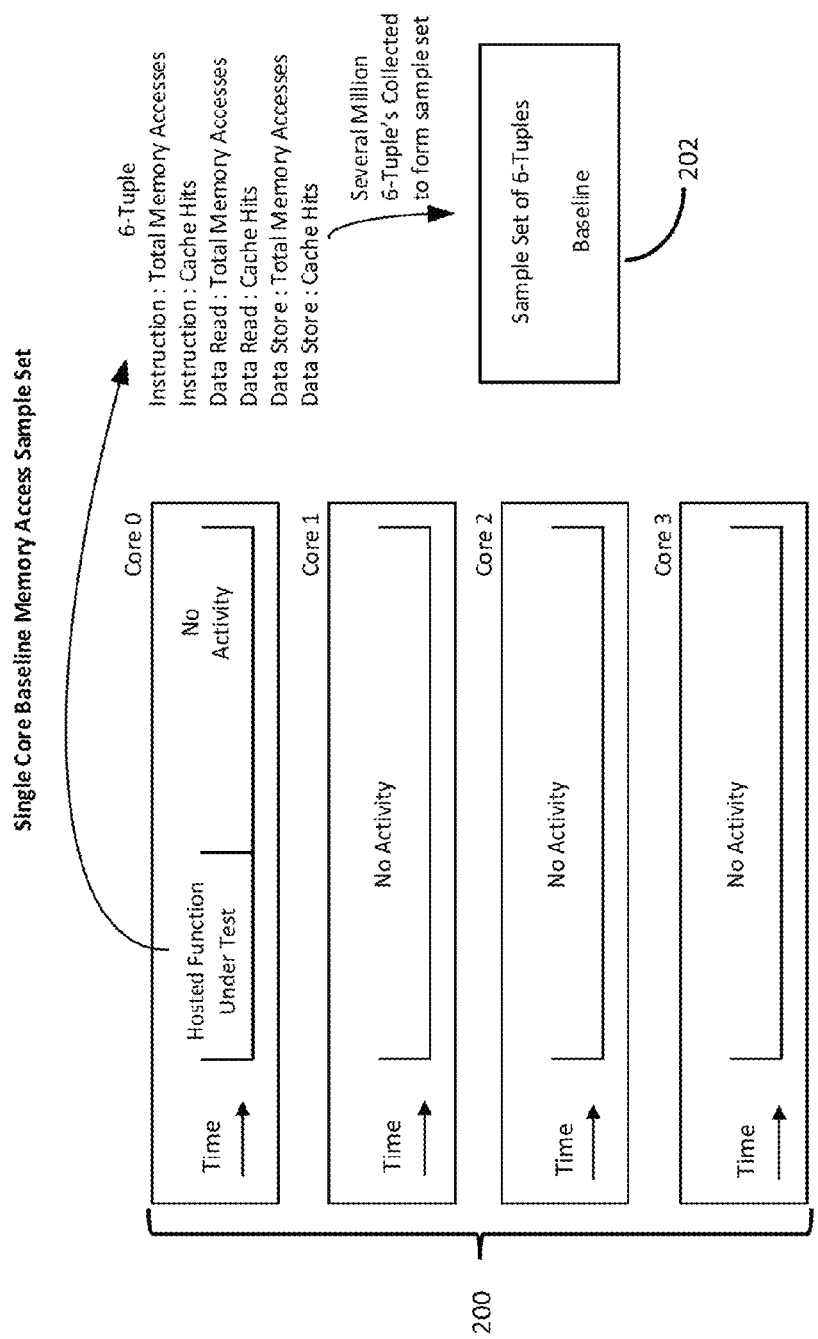
FIG. 3 is an illustration depicting an exemplary implementation of a single-core baseline evaluation step according to an exemplary embodiment of the inventive concepts disclosed herein.
Figure 4:
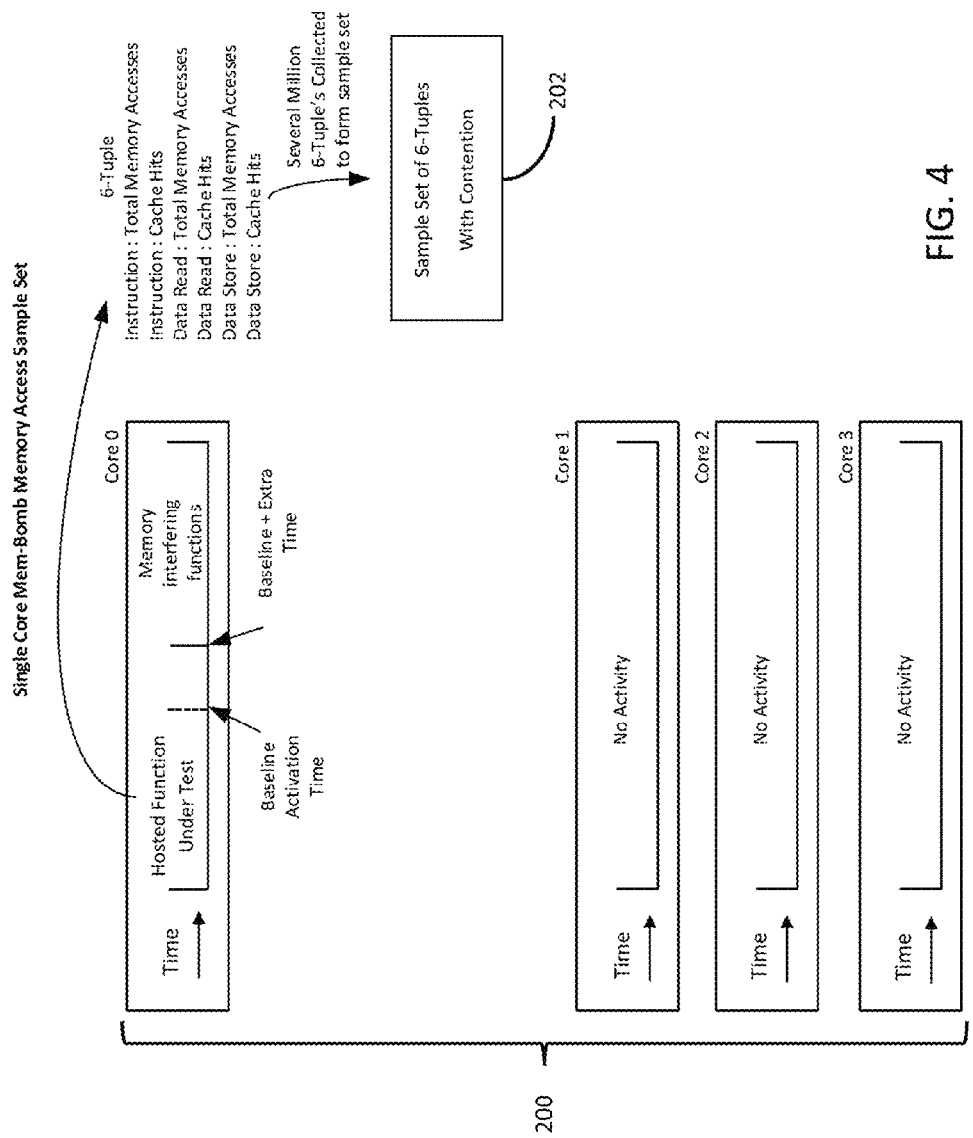
FIG. 4 is an illustration depicting an exemplary implementation of a single-core contention evaluation step according to an exemplary embodiment of the inventive concepts disclosed herein.

Turning now to FIGS. 3 and 4, illustrations depicting an exemplary implementation of the single-core contention evaluation step 104 are shown. The single-core contention evaluation step 104 depicted herein may be utilized to characterize data access performance degradations that may be experienced by a particular hosted function (the hosted function under test) running on a particular core of the multi-core processor 200. For purposes of presentation simplicity, the hosted function under test is shown to be loaded on Core 0 of the multi-core processor 200. It is to be understood that the hosted function under test may be loaded on other cores of the multi-core processor 200 without departing from the broad scope of the inventive concepts disclosed herein.

With the hosted function under test loaded on the multi-core processor 200, the single-core contention evaluation step 104 may start observing the data access performance of the hosted function under test to establish a baseline activation time of the hosted function under test. In some embodiments, the hosted function under test may be activated a number of times, and data regarding memory accesses and cache hit counts may be obtained/recorded in a non-transitory processor readable media (e.g., a data storage device) 202 for each activation. In some embodiments, because memory access rates may differ between read and write, data regarding memory accesses and cache hit counts for read and write may be obtained/recorded separately. Similarly, in some embodiments, data regarding of memory accesses and cache hit counts for instructions and data may be obtained/recorded separately. In some embodiments, memory accesses and cache hit counts may be obtained/recorded for each access type, including instruction, data read, and data write. This information may be collected into a 6-tuple having the form (instruction: memory access count, instruction: cache hit count, data read: memory access count, data read: cache hit count, data write: memory access count, data write: cache hit count), which is also depicted in the figures.

It is noted that when the baseline activation time of the hosted function under test is being established, the other cores (Cores 1, 2, and 3 in the example depicted in FIG. 3) of the multi-core processor 200 may remain idle or may be configured to execute only minimally interfering test harness support functions. In other words, the hosted function under test may be sufficiently isolated to minimize potential interferences that may occur during the baseline establishment process. It is noted that the baseline activation time of the hosted function under test established in this manner may represent an amount of time needed for the hosted function under test to complete its intended function on a single core without any multi-core contentions.

In some embodiment, three types of potential interferences may be allowed to exist when the baseline activation time of the hosted function under test is being established. The three types of potential interferences may include: 1) computing platform specific support needed to make the computing platform functional, 2) simulated input and output support needed to simulate the workload, and 3) additional hosted functions that are closely coupled to the hosted function under test, and may therefore be required to be loaded on the same core where the baseline activation time of the hosted function under test is being evaluated. It is to be understood that the inclusion of the required additional hosted functions is acceptable because the interferences introduced by these additional hosted functions during the evaluation process will also exist in the final configuration (in which the additional hosted functions will co-exist with the hosted function under test). It is also to be understood that while the inclusion of platform specific support and simulated input and output support may result in a slightly overestimated baseline activation time (relative to a pure baseline case where no interference exists), such an overestimated baseline activation time may be acceptable because it still establishes a reasonably conservative baseline estimation of the activation time needed by the hosted function under test in the absence of multi-core contentions.

With the baseline activation time established for the hosted function under test, the single-core contention evaluation step 104 may start evaluating whether the hosted function under test can provide its intended function in the presence of cache interfering functions running on the same core where the hosted function under test is loaded. Referring to FIG. 4, in some embodiments, the core where the hosted function under test is loaded (Core 0) may be loaded with memory interfering functions that are designed to interfere with data access of the hosted function under test. In other words, the memory interfering functions loaded on Core 0 may introduce single-core contentions in a computationally demanding manner (e.g., evict the content of the cache accessible to Core 0, issue cache flush and/or cache invalidate instructions as ways to stress test the hosted function under test loaded on Core 0). In light of the presence of such single-core contentions, the hosted function under test may be provided with an extra amount of time (e.g., determined based on historical information) to help the hosted function under test perform its intended function. In some embodiments, this extra time may be provide to be sufficiently large to ensure that the hosted function under test is able to complete its intended function in the presence of single-core contentions. In other words, the sum of the established baseline activation time plus the extra time provided should ensure that the hosted function under test has access to a sufficient amount of computation capacity to complete its intended function (e.g., no missed deadlines) in the presence of single-core contentions.

With the extra time allocated, the hosted function under test may be activated multiple times and data regarding memory accesses and cache hit counts for each activation may be obtained/recorded in the non-transitory processor readable media 202. In effect, a set of data regarding memory accesses and cache hit counts of the hosted function under test running in the presence of single-core contentions may be obtained/recorded. This set of data may then be utilized in conjunction with the results obtained by the multi-core contention evaluation step 102 (which include data representing changes in cache inspection times and memory access rates for various types of accesses, including instructions, data reads, and data writes) to characterize changes in activation times due to multi-core and single-core contentions. The changes characterized in this manner may then be utilized to calculate an adjustment time to the baseline activation time of the hosted function under test in the step 106.

In some embodiments, a change in activation time with respect to the baseline activation time, denoted as $\Delta AT$, is calculated for each activation of the hosted function under test. In some embodiments, the $\Delta AT$ for the i-th activation of the hosted function under test may be calculated as the sum of ΔAT for each type of access (e.g., instruction, data read, and data write) performed in the i-th activation, which may include:

ΔAT for instruction-type access=(instruction-type memory access count)×(changes in cache inspection time for an instruction-type memory access due to multi-core contentions)+(instruction-type memory access cache misses)×(changes in memory access rate for an instruction-type memory access due to multi-core contentions);

ΔAT for data read-type memory access=(data read-type memory access count)×(changes in cache inspection time for a data read-type memory access due to multi-core contentions)+(data read-type memory access cache misses)×(changes in memory access rate for a data read-type memory access due to multi-core contentions); and ΔAT for data write-type memory access=(data write-type memory access count)×(changes in cache inspection time for a data write-type memory access due to multi-core contentions)+(data write-type memory access cache misses)×(changes in memory access rate for a data write-type memory access due to multi-core contentions).

It is noted that the "instruction-type memory access count", the "instruction-type memory access cache misses", the "data read-type memory access count", the "data read-type memory access cache misses", the "data write-type memory access count", and the "data write-type memory access cache misses" referenced in the equations above are referring to information collected for each activation of the hosted function under test during single-core contention evaluation (step 104). The "changes in cache inspection time for an instruction-type memory access due to multi-core contentions", the "changes in memory access rate for an instruction-type memory access due to multi-core contentions", the "changes in cache inspection time for a data read-type memory access due to multi-core contentions", the "changes in memory access rate for a data read-type memory access due to multi-core contentions", the "changes in cache inspection time for a data write-type memory access due to multi-core contentions", and the "changes in memory access rate for a data write-type memory access due to multi-core contentions" referenced in the equations above are referring to information collected during multi-core contention evaluation (step 102). It is therefore noted that the change in activation time (ΔAT) calculated in this manner allows it to take both multi-core and single-core contentions (evaluated in steps 102 and 104, respectively) into consideration, providing a feature that may be appreciated for performance evaluations of multi-core processors.

Figure 5:
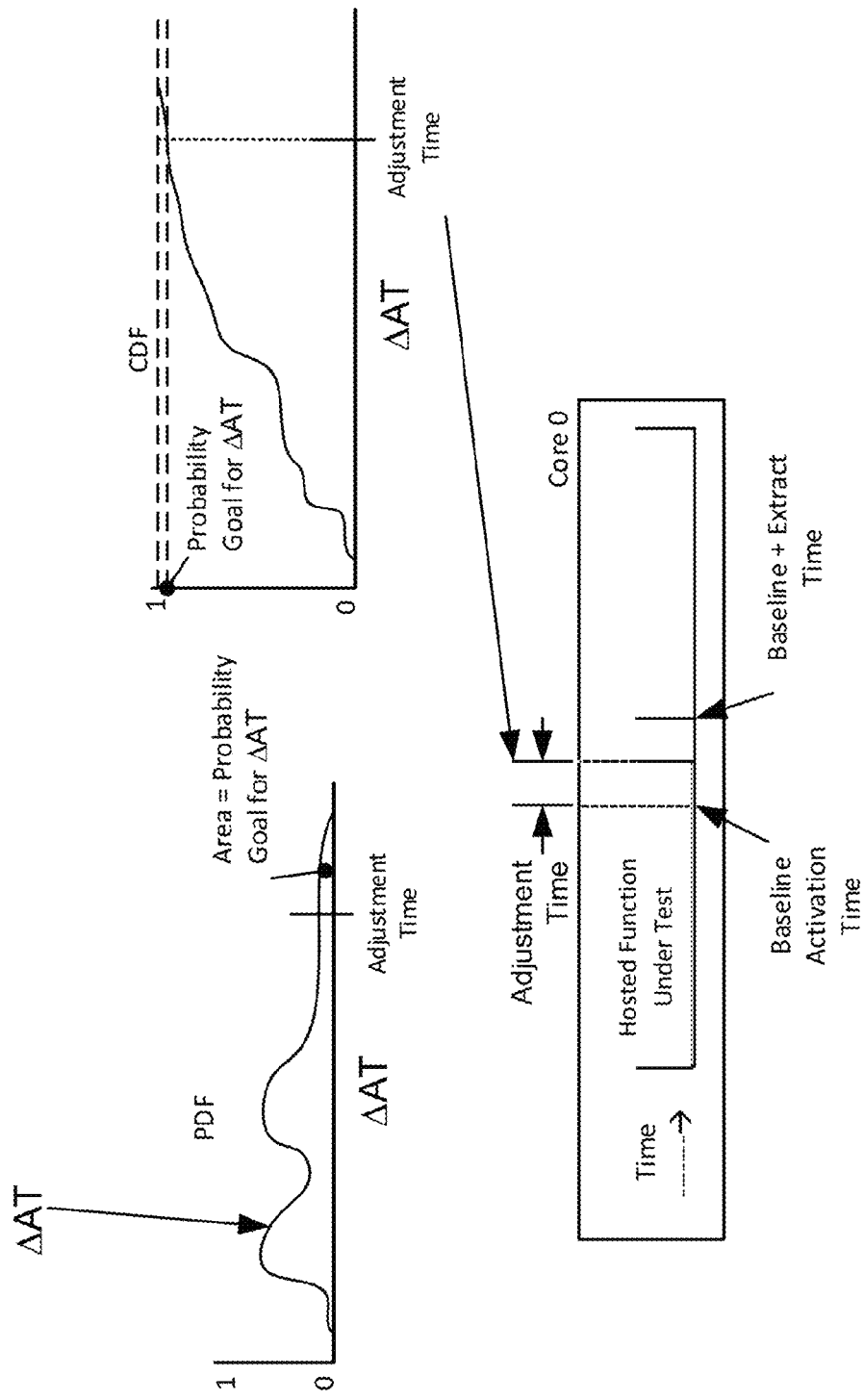
FIG. 5 is an illustration depicting an exemplary implementation of an adjustment time calculation step according to an exemplary embodiment of the inventive concepts disclosed herein.

With ΔAT calculated for each activation of the hosted function under test, a collection of such ΔATs may be made available for statistical analysis to help determine the adjustment time needed to the baseline activation time of the hosted function under test. In some embodiments, as shown in FIG. 5, the ΔATs may be utilized to create a probability distribution function (PDF) or a cumulative distribution function (CDF), which may allow an appropriate adjustment time to be selected so that the accumulated probability of the hosted function under test having enough time to complete its workload for a given activation is equal to one minus an acceptable probability of unavailability of that hosted function. It is noted that the adjustment time may not need to be as significant as the extra time allocated during the single-core contention evaluation step 102; instead, the adjustment time may only need to be allocated to overcome the effects of multi-core and single-core contentions at a predetermine/prescribed probability goal. In this manner, the probability that the hosted function under test needs more computation time (to complete its workload for a given activation) than the allocated baseline plus the adjustment time is equal to the probability goal. Therefore, the additional allocation of the adjustment time may be considered adequate for the hosted function under test.

It is to be understood that the process described above may be performed for a number of hosted functions to determine their baseline activation times and adjustment times. It is contemplated that the sum of the baseline activation time and the adjustment time associated with each particular host function evaluated in this manner may effectively establish a computation time requirement for that particular host function. It is noted that the establishment of computation time requirements for the hosted functions may help determine how they can be arranged/composed on a given multi-core processor. It is contemplated that the hosted functions arranged/composed in this manner may have adequate computation times allocated despite the computation derations that may occur.

As will be appreciated from the above, systems and methods configured in accordance with embodiments of the inventive concepts discloses herein may effectively relate the impact of the presence of other active cores on a multi-core processor to a probability of computation starvation on a given core. The impact of the presence of the other active cores may therefore be considered and effectively managed, which may also help reduce certification costs (e.g., when used to host avionic functions) and make better usage of processor capacities both in nominal realized performance and on the basis of analysis justified performances.

It is contemplated that systems and methods configured in accordance with embodiments of the inventive concepts discloses herein may be utilized to evaluate various types of multi-core processors without departing from the broad scope of the inventive concepts disclosed herein. It is to be understood that while a multi-core processor with four cores is shown in the examples above, such a multi-core processor is not meant to be limiting. It is contemplated that multi-core processors with different number of cores may be evaluated in the same manner without departing from the broad scope of the inventive concepts disclosed herein.

It is also to be understood that while the evaluation processes described above are shown to be performed during each activation of the hosted function under test, such depictions are merely illustrative and are not meant to be limiting. It is contemplated that the evaluation processes may be performed at any level of scheduling without departing from the broad scope of the inventive concepts disclosed herein. For instance, the evaluation processes described above may be applicable to the process level scheduling within a hosted function under test if the hosted function under test supports an internal process (e.g., thread level) scheduling technique. In such cases, the baseline activation time of a certain thread within the hosted function under test may be determined with the other threads being active, and a scheduling algorithm (may include first in first out, earliest deadline first, rate monotonic, and various other types of scheduling approaches) may be selected to facilitate the scheduling of the various threads within the hosted function under test. It is to be understood that the thread level evaluation processes are presented herein merely for illustrative purposes. It is contemplated that whether to implement such evaluation processes may vary without departing from the broad scope of the inventive concepts disclosed herein.

It is also contemplated that various types of hosted functions may be subjected to the evaluation process without departing from the broad scope of the inventive concepts disclosed herein. It is contemplated that some of the exemplary hosted functions may include avionic functions or functions concerning operations of vehicles (e.g., aircraft). Such functions may include, for example, flight check list, flight management systems, health monitoring, data load, radio control, control panel, traffic alert and collision avoidance, window heat, nose wheel steering, landing gear extend, weather radar, display generation, data concentration, aircraft maintenance, cockpit audio, engine control, data link, air data computer, and flight control functions. It is contemplated that other types of hosted functions may be evaluated and/or managed in the same manner as described above without departing from the broad scope of the inventive concepts disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

It is believed that the inventive concepts disclosed herein and many of their attendant advantages will be understood by the foregoing description, and it will be apparent that various changes may be made in the form, construction, and arrangement of the components thereof without departing from the broad scope of the inventive concepts or without sacrificing all of their material advantages. The form herein before described being merely an explanatory embodiment thereof, it is the intention of the following claims to encompass and include such changes.

What is claimed is:

1. A method, comprising:
  determining effects of multi-core contentions on at least one particular core of a multi-core processor, the determining effects of multi-core contentions on at least one particular core of a multi-core processor comprises:
    executing a set of instructions loaded on the at least one particular core to establish a baseline data access performance of the at least one particular core when other cores of the multi-core processor are set to idle;
    activating at least one other core of the multi-core processor to introduce multi-core contentions; and
    executing the set of instructions loaded on the at least one particular core to obtain changes in the baseline data access performance of the at least one particular core when the at least one other core of the multi-core processor is activated to introduce multi-core contentions;
  determining effects of single-core contentions on at least one particular hosted function hosted on the multi-core processor, the determining effects of single-core contentions on at least one particular hosted function hosted on the multi-core processor comprises:
    loading at least one cache interfering function on a core where the at least one particular hosted function is hosted;
    activating the at least one particular hosted function multiple times in the presence of the at least one cache interfering function; and
    recording data regarding memory access and cache hit for each activation of the at least one particular hosted function;
  determining an adjustment time to a baseline activation time for the at least one particular hosted function, wherein the adjustment time plus the baseline activation time overcome the effects of multi-core contentions and single-core contentions at a predetermined probability goal; and
  adjusting a computation time requirement of the at least one particular hosted function to include the adjustment time and the baseline activation time.

2. The method of claim 1, wherein the set of instructions loaded on the at least one particular core includes a representative sample of burst and strides.

3. The method of claim 1, wherein the step of determining the adjustment time to the baseline activation time for the at least one particular hosted function further comprises:
  calculating a change in activation time for each activation of the at least one particular hosted function;
  creating a cumulative distribution function based on the change in activation time calculated for each activation of the at least one particular hosted function; and
  determining the adjustment time based on the cumulative distribution function created.

4. The method of claim 3, wherein the change in activation time for each activation of the at least one particular hosted function is calculated at least partially based on: 1) the data regarding memory access and cache hit for each activation of the at least one particular hosted function, and 2) the changes in the baseline data access performance of the at least one particular core.

5. The method of claim 3, wherein a probability that the at least one particular hosted function needs more computation time than the adjustment time plus the baseline activation time is equal to the predetermined probability goal.

6. The method of claim 1, wherein the at least one particular hosted function is an avionic function.

7. A method, comprising:
  determining effects of multi-core contentions on at least one particular core of a multi-core processor, the determining effects of multi-core contentions on the at least one particular core of the multi-core processor further comprises:
    executing a set of instructions loaded on the at least one particular core to establish a baseline data access performance of the at least one particular core when other cores of the multi-core processor are set to idle;
    activating at least one other core of the multi-core processor to introduce multi-core contentions; and
    executing the set of instructions loaded on the at least one particular core to obtain changes in the baseline data access performance of the at least one particular core when the at least one other core of the multi-core processor is activated to introduce multi-core contentions;
  determining effects of single-core contentions on at least one particular hosted function hosted on the multi-core processor, the determining effects of single-core contentions on the at least one particular hosted function hosted on the multi-core processor further comprises:

loading at least one cache interfering function on a core where the at least one particular hosted function is hosted;

activating the at least one particular hosted function multiple times in the presence of the at least one cache interfering function; and recording data regarding memory access and cache hit for each activation of the at least one particular hosted function;

determining an adjustment time to a baseline activation time for the at least one particular hosted function, wherein the adjustment time plus the baseline activation time overcome the effects of multi-core contentions and single-core contentions at a predetermined probability goal; and allocating computation time of the multi-core processor to the at least one particular hosted function based on the adjustment time and the baseline activation time determined for the at least one particular hosted function.

8. The method of claim 7, wherein the set of instructions loaded on the at least one particular core includes a representative sample of burst and strides.

9. The method of claim 7, wherein the step of determining the adjustment time to the baseline activation time for the at least one particular hosted function further comprises:

calculating a change in activation time for each activation of the at least one particular hosted function;

creating a cumulative distribution function based on the change in activation time calculated for each activation of the at least one particular hosted function; and determining the adjustment time based on the cumulative distribution function created.

10. The method of claim 9, wherein the change in activation time for each activation of the at least one particular hosted function is calculated at least partially based on: 1) the data regarding memory access and cache hit for each activation of the at least one particular hosted function, and 2) the changes in the baseline data access performance of the at least one particular core.

11. The method of claim 9, wherein a probability that the at least one particular hosted function needs more computation time than the adjustment time plus the baseline activation time is equal to the predetermined probability goal.

12. The method of claim 7, wherein the at least one particular hosted function is an avionic function.

13. A system, comprising:

at least one data storage device; and at least one multi-core processor in communication with the at least one data storage device, the at least one multi-core processor configured to:

facilitate determination of data access performance effects of multi-core contentions on at least one particular core of the multi-core processor;

execute a set of instructions loaded on the at least one particular core to access the at least one data storage device to establish a baseline data access performance of the at least one particular core when other cores of the multi-core processor are set to idle;

activate at least one other core of the multi-core processor to access the at least one data storage device to introduce multi-core contentions;

execute the set of instructions loaded on the at least one particular core to access the at least one data storage device to obtain changes in the baseline data access performance of the at least one particular core when the at least one other core of the multi-core processor is activated to facilitate determination of data access performance effects of multi-core contentions on the at least one particular core;

facilitate determination of data access performance effects of single-core contentions on at least one particular hosted function hosted on the multi-core processor;

load at least one cache interfering function on a core where the at least one particular hosted function is hosted;

activate the at least one particular hosted function multiple times in the presence of the at least one cache interfering function; and record data regarding memory access and cache hit for each activation of the at least one particular hosted function to facilitate determination of data access performance effects of single-core contentions on the at least one particular hosted function;

facilitate determination of an adjustment time to a baseline activation time for the at least one particular hosted function, wherein the adjustment time plus the baseline activation time overcome the data access performance effects of multi-core contentions and single-core contentions at a predetermined probability goal; and allocate computation time of the multi-core processor to the at least one particular hosted function based on the adjustment time and the baseline activation time determined for the at least one particular hosted function.

14. The system of claim 13, wherein the determination of the adjustment time to the baseline activation time for the at least one particular hosted function comprises:

calculate a change in activation time for each activation of the at least one particular hosted function;

create a cumulative distribution function based on the change in activation time calculated for each activation of the at least one particular hosted function; and determine the adjustment time based on the cumulative distribution function created, wherein the change in activation time for each activation of the at least one particular hosted function is calculated at least partially based on: 1) the data regarding memory access and cache hit for each activation of the at least one particular hosted function, and 2) the changes in the baseline data access performance of the at least one particular core.

* * * * *